US 6,720,086 B1

(12) United States Patent
Strutt

(10) Patent No.: US 6,720,086 B1
(45) Date of Patent: Apr. 13, 2004

(54) LIQUID INTERFACE DIFFUSION BONDING OF NICKEL-BASED SUPERALLOYS

(75) Inventor: Andrew J. Strutt, La Jolla, CA (US)

(73) Assignee: Rohr, Inc., Chula Vista, CA (US)

( * ) Notice: Subject to any disclaimer, the term of this patent is extended or adjusted under 35 U.S.C. 154(b) by 104 days.

(21) Appl. No.: 10/010,553

(22) Filed: Nov. 2, 2001

(51) Int. Cl.⁷ .............................. B32B 3/12; B23K 1/00
(52) U.S. Cl. ...................... 428/593; 428/660; 228/181; 228/194; 228/195; 228/262.3; 228/262.31
(58) Field of Search ................................ 428/593, 660; 228/181, 262.3, 262.31, 194, 195

(56) References Cited

U.S. PATENT DOCUMENTS

| | | | |
|---|---|---|---|
| 3,859,144 A | * 1/1975 | Basche et al. ............... 148/279 |
| 4,005,988 A | * 2/1977 | Paulonis et al. ............. 428/652 |
| 4,059,217 A | 11/1977 | Woodward .................... 228/181 |
| 4,126,449 A | 11/1978 | Tanner et al. ................. 75/164 |
| 4,592,120 A | 6/1986 | Egan et al. ................. 29/156.8 |
| 4,676,843 A | 6/1987 | Nazmy ...................... 148/11.5 |
| 4,681,251 A | 7/1987 | Komatsu et al. ............. 228/208 |
| 4,700,881 A | 10/1987 | Ryan .......................... 228/194 |
| 5,806,751 A | 9/1998 | Schaefer et al. ............ 228/119 |
| 5,836,075 A | 11/1998 | Fitzgerald et al. .......... 29/889.2 |
| 6,325,871 B1 | * 12/2001 | Burke et al. ................. 148/522 |
| 6,475,637 B1 | * 11/2002 | Strutt et al. ................. 428/593 |

* cited by examiner

Primary Examiner—John J. Zimmerman
Assistant Examiner—Jason L Savage
(74) Attorney, Agent, or Firm—Goodwin Procter LLP

(57) ABSTRACT

A liquid interface diffusion bonded composition comprises a metal honeycomb core such as a nickel-alloy honeycomb core and a nickel-alloy facing sheet bonded thereto. The composition and method of this invention are useful in applications where high strength, heat resistant materials are required, such as in aircraft and aerospace-related structures. The composition is prepared by a method comprising: (a) providing a nickel-alloy honeycomb core having a mating surface and a nickel-alloy facing sheet having a mating surface; (b) placing together the honeycomb core mating surface and the facing sheet mating surface, and providing therebetween a metal foil comprising nickel, zirconium, and at least one additional metal selected from the group consisting of titanium, niobium, and chromium; (c) subjecting the mating surfaces and metal foil therebetween to sufficient positive pressure to maintain position and alignment for joining; and (d) heating the mating surfaces and metal foil therebetween in a protective atmosphere for at least 2 hours to a temperature sufficient to cause melting between the metal foil and mating surfaces of the facing sheet and honeycomb core.

12 Claims, 5 Drawing Sheets

LIQUID INTERFACE DIFFUSION BONDING OF NICKEL-BASED SUPERALLOYS

BACKGROUND OF THE INVENTION

1. Field of the Invention

This invention relates to a liquid interface diffusion (LID) bonded composition and a method of preparing such a composition. More particularly, this invention relates to the use of metallic alloys for joining nickel-based superalloys in a LID bonding process. The composition and method of this invention are useful where high strength, heat resistant materials are required, such as in aircraft and aerospace-related structures.

2. Background Information

Brazing and diffusion bonding methods for the joining of nickel-alloy structures are known to those skilled in the art. However, few of these are well-suited to bonding nickel-alloy honeycomb sandwich panel structures. A limited number of techniques exist for diffusion bonding nickel-alloys, such as Hot Isostatic Pressing (HIPing) of plasma sprayed coatings (U.S. Pat. No. 4,592,120), boron-enriched nickel-alloy foils (U.S. Pat. No. 4,700,881), or other techniques involving the sputter-deposition of boron onto the mating surfaces of a joint (U.S. Pat. No. 5,836,075). Another technique exists for repairing cavities in e.g. turbine engine components using metallic powder pastes containing boron and silicon (U.S. Pat. No. 5,806,751). However, in the case of components fabricated from nickel-based superalloy honeycomb core and face sheets, joining techniques have previously been limited to brazing, and no liquid interface diffusion process has been available.

Certain oxidation resistant nickel-based superalloys such as INCONEL 617 with relatively high aluminum-contents are also difficult to braze due to poor wettability by most brazing alloys. This disadvantage renders these alloys unsuitable for brazing and they are therefore of limited use in the form of honeycomb sandwich panel applications where oxidation resistance is required. This problem could be avoided if a LID-type process could be used to join nickel-alloys. In LID-bonding, the high degree of fusion does not require good wettability of a braze alloy across the joint surfaces.

Many brazing alloys used for joining nickel-based superalloys contain boron to lower the melting point of the nickel-rich braze alloy to form a joint. Although boron is very effective in this capacity, its rate of diffusion at elevated temperature is extremely rapid. This is particularly the case for diffusion along grain boundaries in the parent material, as noted in e.g. U.S. Pat. No. 4,700,881. This phenomenon leads to the potential problem of boron diffusing away from the joint interface (in the solid state) before the brazing alloy has been brought up to its melting temperature. If the assembly to be joined cannot be raised to the brazing temperature fast enough, there is a risk that excessively rapid diffusion of boron will prevent adequate melting of the braze alloy and no bonding will occur. An excessive sensitivity to process thermal cycles can make brazing difficult for large honeycomb sandwich structures where thermal equilibrium cannot be established quickly. This problem would be less acute in the case of LID-bonding provided that some other alloying element was substituted for boron to achieve a sufficient depression of the melting point of the parent material.

A further disadvantage of brazing processes is the significant compositional heterogeneity across the joint interface. This is due to the general lack of fusion between the braze alloy and the parent material. When used in corrosive environments (such as some fuel combustion atmospheres) this phenomenon has the potential of increasing the susceptibility of the bonded structure to micro-galvanic corrosion. This disadvantage could be eliminated with the significantly greater degree of fusion associated with a LID-bond if a LID-bonding system could be derived for joining nickel-based superalloys.

U.S. Pat. No. 4,059,217 is directed to LID bonding nickel- and cobalt-based superalloys. However, the filler alloys specified in this patent also include boron (to permit melting as described above) and therefore are prone to the same disadvantages as boron-containing braze filler alloys. An additional disadvantage of the technique described in U.S. Pat. No. 4,059,217 relates to the plating method used to apply the LID-bonding alloy, which does not always guarantee a uniform thickness of deposit. This problem can be overcome in the foil application method described in the current invention.

U.S. Pat. No. 4,126,449 is directed to amorphous zirconium-titanium alloys with iron, cobalt, nickel or copper as the third element. The invention relates only to the alloy compositions and not to any specific application of the alloys.

U.S. Pat. No. 4,676,843 is directed to a process for joining component workpieces made of a superalloy employing a diffusion bonding process. The diffusion bonding process requires the powdered form of the parent alloy, i.e. a powder having either the same or a very similar composition to the parent material of the mating surfaces. As a consequence, no transient liquid phase would be formed as a result of diffusion between the filler alloy and the parent material as is the case in LID bonding. In the method described in U.S. Pat. No. 4,676,843, heat and pressure are used to consolidate the powder into a solid in a relatively large gap of (initially) 1 to 2 mm (0.04 to 0.08") between the mating surfaces. For this process to be successful, the mating surfaces have to be either large in area or have grooves cut into them, in order to contain the powder. This method would not be suitable for joining core to face sheets in honeycomb panel applications. In these fabrications, the joint interface area is relatively small, due to the thin gage of the honeycomb foil (typically 0.002 to 0.003"). It would clearly be impractical to attempt to cut grooves in the edges of the honeycomb cell walls to contain the powdered form of the filler alloy for the method of U.S. Pat. No. 4,676,843.

U.S. Pat. No. 4,681,251 is directed to a method of joining nickel-alloy articles such as gas turbine engine components. The method uses an aluminum film which is sputtered onto the mating surfaces of the workpieces in a physical vapor deposition (PVD) process under vacuum. The method of this invention is well suited to small articles such as actively-cooled turbine blades of the type which are exposed to highest operating temperatures in aircraft jet engines, as shown in FIG. 1 of U.S. Pat. No. 4,681,251. However, the method used to deposit the bonding alloy (in this case aluminum) is not well suited for joining large components such as nickel-alloy honeycomb sandwich panels and ducts. This is because the sputtering process (where atoms or ions of the filler alloy are produced from a point source) cannot easily deposit a coating of uniform thickness over a large area of typically several sq. ft.

A method and composition prepared by a LID bonding method are disclosed in U.S. patent application Ser. No. 09/736,774. The method and composition of this U.S. patent application are directed to a titanium honeycomb core and titanium facing sheets and require therebetween a foil that comprises copper, nickel, zirconium and titanium. The foil of the filler alloy in this patent application has a composition specifically selected to produce a transient liquid phase with the particular composition of the titanium-alloy of the mating surfaces of the parent material. The transient liquid phase is based on a multi-component eutectic alloy formed between the filler alloy and the parent alloy. As such, the filler alloy composition of U.S. patent application Ser. No. 09/736,774 cannot be used to join nickel-alloys, which are the subject of the current invention.

The present invention uses a foil interlayer of an alloy for use in applications involving the joining of nickel honeycomb materials. The present invention allows for a greater degree of fusion across the joint interface than would be possible with conventional brazing technology. This provides greater mechanical integrity of the bond and significantly greater peel strength for honeycomb structures made from nickel-based superalloys. In turn, this requires fewer repair pins to be used in those honeycomb structures. Repair pins are often used in large numbers on conventionally brazed honeycomb structures made from nickel-based superalloys in efforts to guarantee the mechanical integrity of the brazed joints.

It is one object of the present invention to provide a liquid interface diffusion bonded composition in which at least one metal honeycomb core is bonded to a metal facing sheet, wherein a foil interlayer comprising nickel, zirconium, and at least one additional metal selected from the group consisting of titanium, niobium, and chromium is used to join the mating surfaces of the honeycomb core and facing sheet by being rendered liquid at the bonding temperature and thereby forming a liquid interface for effecting diffusion bonding of the core and facing sheet. It is another object of this invention to provide a method of preparing such a composition. The LID process of the present invention enables the bonding of such metal components, including the bonding of slightly mismatched mating surfaces of such components, and is less critically dependant on furnace heating rates than is the case with conventional boron-containing braze alloys. This reduces the incidence of in-process dis-bonds and further reduces the need for costly re-work. The composition and method of this invention are useful in applications where high strength, heat resistant materials are required, such as in aircraft and aerospace-related structures.

SUMMARY OF THE INVENTION

The liquid interface diffusion bonded composition of this invention comprises a metal honeycomb core and a metal facing sheet bonded thereto, wherein the composition is prepared by a method comprising:

(a) providing a nickel-alloy honeycomb core having a mating surface and a nickel-alloy facing sheet having a mating surface;

(b) placing together the honeycomb core mating surface and the facing sheet mating surface, and providing therebetween a metal foil comprising nickel, zirconium, and at least one additional metal selected from the group consisting of titanium, niobium, and chromium;

(c) subjecting the mating surfaces and metal foil therebetween to sufficient positive pressure to maintain position and alignment for joining; and (d) heating the mating surfaces and metal foil therebetween in a protective atmosphere for at least 2 hours to a temperature sufficient to cause melting between the metal foil and mating surfaces of the facing sheet and honeycomb core.

In one preferred embodiment of this invention, the liquid interface diffusion bonded composition of this invention comprises a metal honeycomb core and a metal facing sheet bonded thereto, wherein the composition is prepared by a method comprising:

(a) providing a nickel-alloy honeycomb core having a mating surface and a nickel-alloy facing sheet having a mating surface;

(b) placing together the honeycomb core mating surface and the facing sheet mating surface, and providing therebetween a metal foil comprising nickel, zirconium, and at least one additional metal selected from the group consisting of titanium and niobium;

(c) subjecting the mating surfaces and metal foil therebetween to sufficient positive pressure to maintain position and alignment for joining; and (d) heating the mating surfaces and metal foil therebetween in a protective atmosphere to a temperature in the range of about 1840 to about 1900 degrees F. for at least 2 hours, preferably 3 hours, to cause melting between the metal foil and mating surfaces of the facing sheet and honeycomb core.

In another preferred embodiment of this invention, the liquid interface diffusion bonded composition of this invention comprises a metal honeycomb core and a metal facing sheet bonded thereto, wherein the composition is prepared by a method comprising:

(a) providing a nickel-alloy honeycomb core having a mating surface and a nickel-alloy facing sheet having a mating surface;

(b) placing together the honeycomb core mating surface and the facing sheet mating surface, and providing therebetween a metal foil comprising nickel, zirconium, and chromium;

(c) subjecting the mating surfaces and metal foil therebetween to sufficient positive pressure to maintain position and alignment for joining; and (d) heating the mating surfaces and metal foil therebetween in a protective atmosphere to a temperature in the range of about 2500 to about 2700 degrees F. for at least 2 hours, preferably 3 hours, to cause melting between the metal foil and mating surfaces of the facing sheet and honeycomb core.

Preferably, the metal foil of the present invention does not comprise copper and does not comprise boron and does not comprise silicon. In one preferred embodiment, the metal foil comprises about 10 to about 14 wt. % zirconium and about 8 to about 12 wt. % titanium, the remainder being nickel. In another preferred embodiment, the metal foil comprises about 10 to about 14 wt. % zirconium and about 20 to about 28 wt. % niobium, the remainder being nickel. In another preferred embodiment, the metal foil comprises about 10 to about 14 wt. % zirconium and about 45 to about 50 wt. % chromium, the remainder being nickel.

In preferred embodiments of the composition and method of this invention, the facing sheet is a nickel-alloy facing sheet, and the metal foil is formed by a rapid solidification process or a melt spinning process.

The composition and method of this invention are useful in applications where high strength, heat resistant materials are required, such as in aircraft and aerospace-related structures.

DETAILED DESCRIPTION OF THE INVENTION

As disclosed, for example, in U.S. Pat. Nos. 3,768,985 and 3,769,101 (both of which are incorporated herein by reference in their entireties), a LID process is a combined liquid and solid state diffusion process for the bonding of various structures. Reference is now made to FIGS. 1–8 herein, which correspond to FIGS. 1–8 in each of U.S. Pat. Nos. 3,768,985 and 3,769,101.

Figure 1:
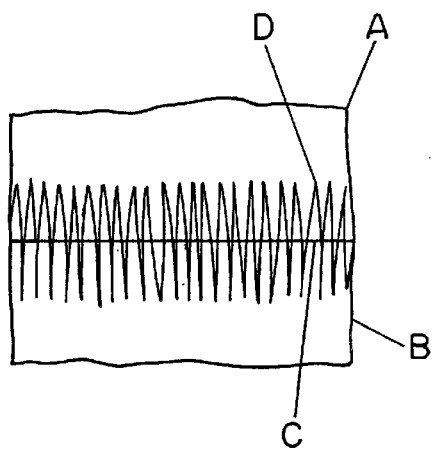
FIG. 1 is a graphic representation of the diffusion bonding of parts under ideal conditions.
Figure 2:
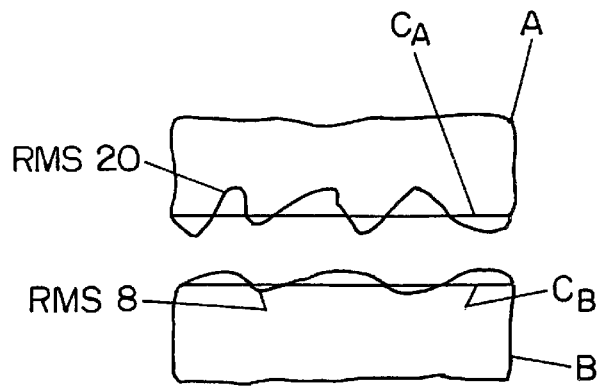
FIG. 2 is a graphic representation of the true surface condition of real parts.

In the theoretical representation of FIG. 1, it is assumed that parts A and B are perfectly flat and clean and fit together perfectly along their common surface or interface C. Under such ideal conditions, the spacing between the parts would be compatible with the interatomic distances between metal atoms, and instantaneous bonding of parts would occur without requiring atomic diffusion. Actually the parts are neither perfectly flat nor clean. As shown, in FIG. 2, in which micrographic portions of parts A and B are shown at many times magnification, the actual RMS 20 surface condition of part A deviates considerably from its nominal flat surface $C_A$, and the actual RMS 8 surface condition of part B also deviates from its nominal flat surface $C_B$. In order to achieve diffusion bonding as represented at D in FIG. 1, it normally becomes necessary to establish an ultraclean condition of the parts, and to employ high pressure and temperature for extended periods of time without causing gross deformation and degradation of mechanical properties which might result from use of excessive time, temperature, or pressure.

Figure 3:
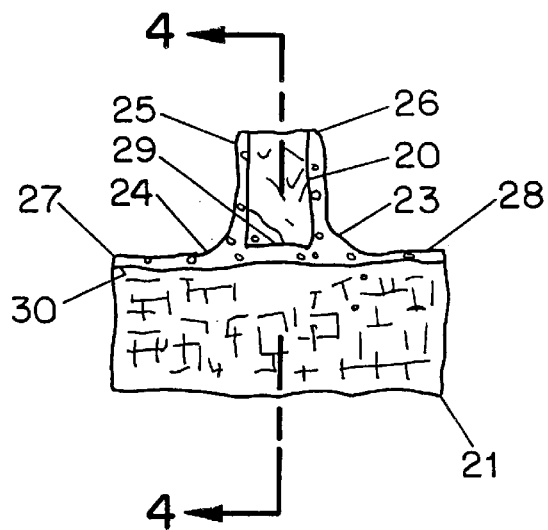
FIG. 3 is a graphic representation of a typical brazed joint.
Figure 4:
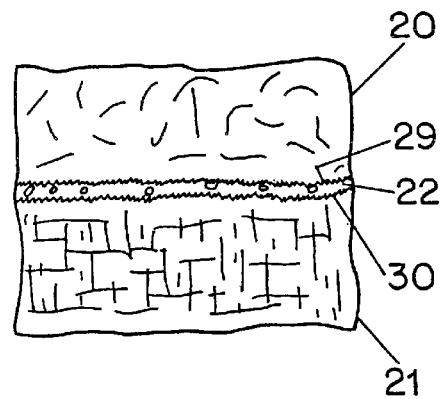
FIG. 4 is a sectional view seen along the line 4—4 of FIG. 3.
Figure 5:
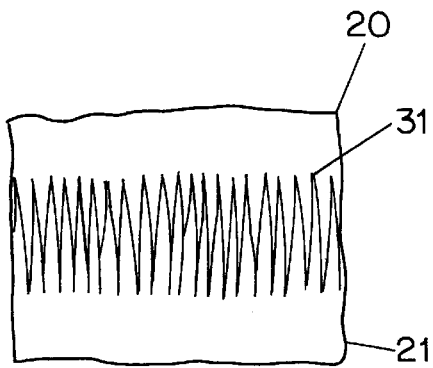
FIG. 5 is a graphic representation of the condition of complete dilution of the braze filler shown in FIG. 4.

A typical brazed joint of a honeycomb panel sandwich structure is disclosed in FIGS. 3 and 4 from which it may be seen that the honeycomb core wall 20 is joined to the facing sheet 21 by the brazing alloy 22 which desirably forms the joint strengthening fillets 23 and 24, but also often forms the undesired extended regions 25, 26 and 27, 28 which excessively add to the weight of the panel structure. The braze alloy actually adds an additional component to the joined assembly, and this component often lacks the desired physical properties of the basis materials.

The zigzag lines 29 and 30 depicted in FIGS. 3 and 4 at the interface of the braze alloy 22 with the core 20 and with the facing sheet 21 represent a condition in which more or less of the brazing material, as an incidence of the brazing operation, has diffused into the basis materials or has reacted therewith. A condition in which all of the braze alloy either fully reacted with the basis materials or has become diluted therewithin is represented at 31 in FIG. 5 as providing an undesirable zone in which degradation of the physical properties of the sandwich panel structure has occurred.

Figure 6:
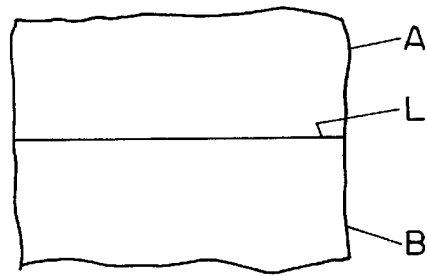
FIG. 6 is a graphical representation showing the liquid interface and diffusion bridge at the mating surface of parts to be bonded in accordance with the method of the present invention.
Figure 7:
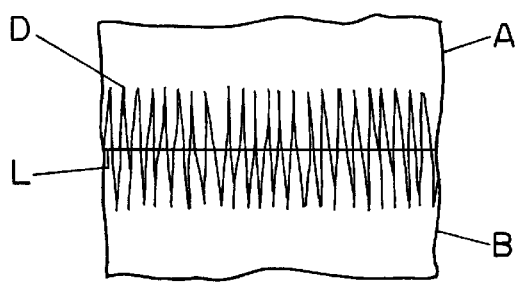
FIG. 7 is a graphical representation of the atomic diffusion and atom transport of the basis materials effected by the diffusion bridge of FIG. 6.
Figure 8:
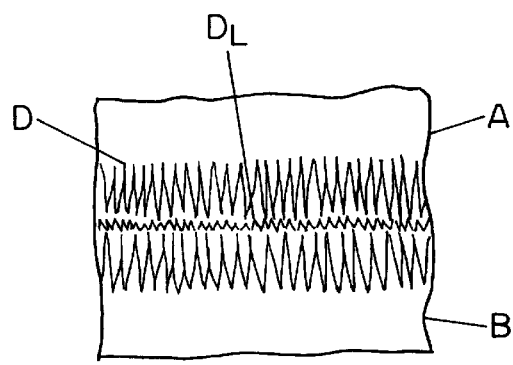
FIG. 8 is a graphical representation of the atom transport of FIG. 7 and additionally showing dilution of the bridge materials.

FIGS. 6 to 8 graphically represent features and resultant effects characteristic of the combined brazing-diffusion bonding process of the present invention and the bonded joint produced thereby. In FIG. 6, the line L represents a liquid interface at the mating surfaces of parts A and B which fills the interfacial voids, depicted in FIG. 2 at the surfaces of these parts, so that metal to metal contact, essential for the diffusion bonding, is established.

When the liquid interface and resultant diffusion bridge has become established, atomic diffusion takes place as depicted at D in FIG. 7; that is, atom transport of the basis materials of parts A and B occurs across the bonded joint represented by the liquid interface L. This diffusion occurs in what is referred to as the secondary or post diffusion phase of the LID process. Also occurring during this diffusion phase is the dilution by diffusion of the liquid interface or diffusion bridge material L into the region of the diffusion joint D as depicted at $D_L$ in FIG. 8.

The LID bonding method of this present invention comprises:

(a) providing a nickel-alloy honeycomb core having a mating surface and a nickel-alloy facing sheet having a mating surface;

(b) placing together the honeycomb core mating surface and the facing sheet mating surface, and providing therebetween a metal foil comprising nickel, zirconium, and chromium;

(c) subjecting the mating surfaces and metal foil therebetween to sufficient positive pressure to maintain position and alignment for joining; and (d) heating the mating surfaces and metal foil therebetween in a protective atmosphere for at least 2 hours to a temperature sufficient to cause melting between the metal foil and mating surfaces of the facing sheet and honeycomb core.

In one preferred embodiment of this invention, the LID bonding method comprises:

(a) providing a nickel-alloy honeycomb core having a mating surface and a metal nickel-alloy facing sheet having a mating surface;

(b) placing together the honeycomb core mating surface and the facing sheet mating surface, and providing therebetween a metal foil comprising nickel, zirconium, and at least one additional metal selected from the group consisting of titanium and niobium;

(c) subjecting the mating surfaces and metal foil therebetween to sufficient positive pressure to maintain position and alignment for joining; and (d) heating the mating surfaces and metal foil therebetween in a protective atmosphere to a temperature in the range of about 1840 to about 2000 degrees F., preferably about 1900° F., for at least 2 hours, preferably 3 hours, to cause melting between the metal foil and mating surfaces of the facing sheet and honeycomb core.

In another preferred embodiment of this invention, the LID bonding method comprises:

(a) providing a nickel-alloy honeycomb core having a mating surface and a metal nickel-alloy facing sheet having a mating surface;

(b) placing together the honeycomb core mating surface and the facing sheet mating surface, and providing therebetween a metal foil comprising nickel, zirconium, and chromium;

(c) subjecting the mating surfaces and metal foil therebetween to sufficient positive pressure to maintain position and alignment for joining; and (d) heating the mating surfaces and metal foil therebetween in a protective atmosphere to a temperature in the range of about 2500 to about 2700 degrees F., for at least 2 hours, preferably 3 hours, to cause melting between the metal foil and mating surfaces of the facing sheet and honeycomb core.

Although not limited thereto, the method of this invention is particularly applicable to the bonding of honeycomb sandwich panel structures formed from nickel and its alloys. Accordingly, in particularly preferred embodiments of the composition and method of this invention, the honeycomb core is a nickel-alloy honeycomb core, and the facing sheet is a nickel facing sheet.

As described above, the metal foil used in this invention to bond the metal honeycomb core and metal facing sheet is a metal foil comprising nickel, zirconium, and at least one additional metal selected from the group consisting of titanium, niobium, and chromium. In a preferred embodiment of this invention, the metal foil is an amorphous, rapidly solidified or melt-spun metal foil formed by a rapid solidification process or a melt spinning process. Metal foils which may be employed in this invention include those described in U.S. Pat. No. 4,221,257, which is incorporated herein by reference in its entirety. The metal foil typically has a thickness in the range of 0.0008–0.0012 inches, and preferably has a thickness of about 0.001 inches.

Preferably, the metal foil of the method of this invention does not comprise copper and does not comprise boron and does not comprise silicon. In one preferred embodiment, the metal foil comprises about 10 to about 14 wt. % zirconium and about 8 to about 12 wt. % titanium, the remainder being nickel. In another preferred embodiment, the metal foil comprises about 10 to about 14 wt. % zirconium and about 20 to about 28 wt. % niobium, the remainder being nickel. In another preferred embodiment, the metal foil comprises about 10 to about 14 wt. % zirconium and about 45 to about 50 wt. % chromium, the remainder being nickel.

Figure 9:
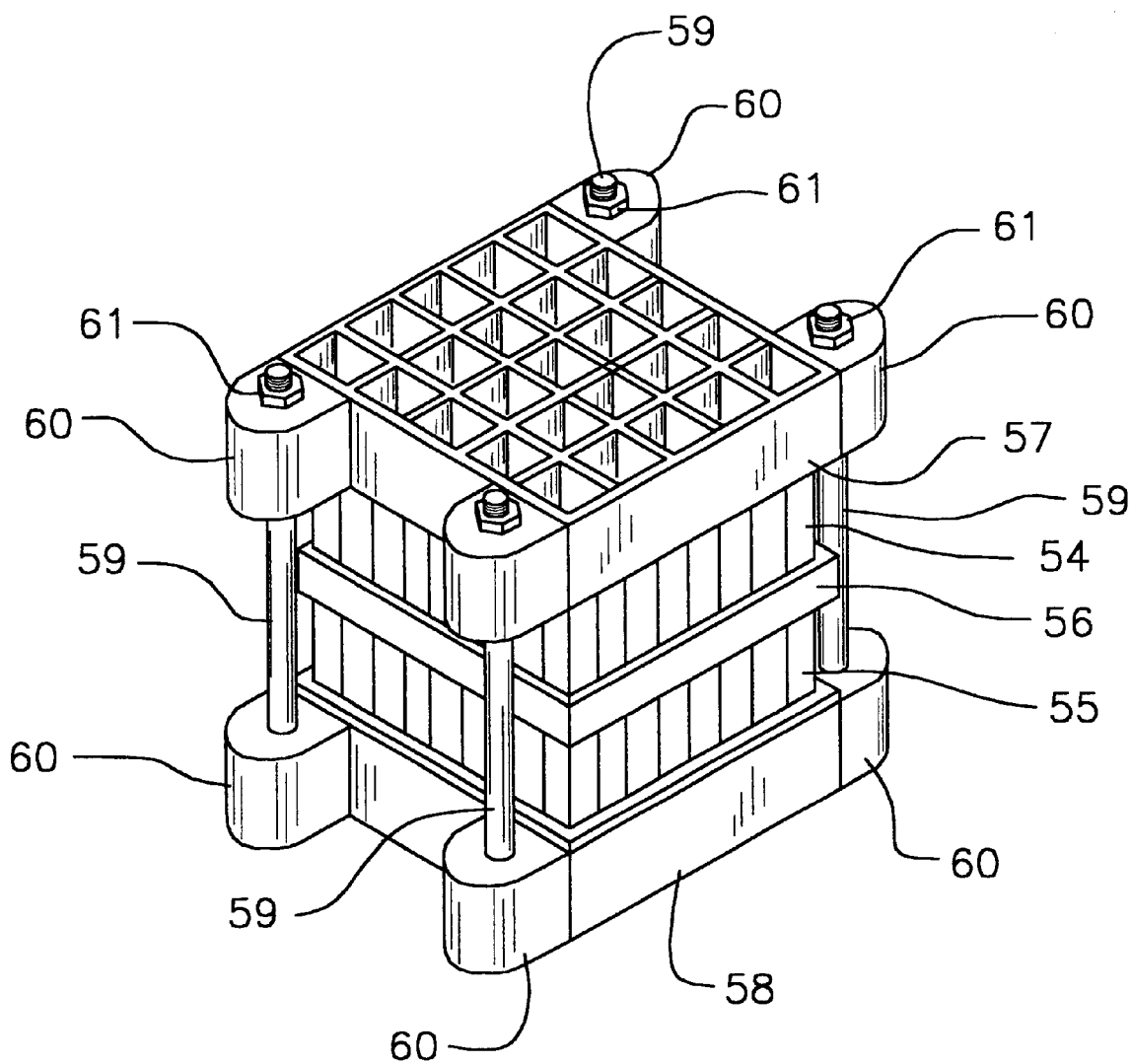
FIG. 9 is a graphical representation of the fixturing arrangement to maintain position and alignment of assembly elements for joining.

In the method of this invention, the metal foil is placed between the honeycomb core mating surface and the facing sheet mating surface, and sufficient positive pressure is applied to that assembly to maintain position and alignment of the various assembly elements for joining. A suitable fixturing or tooling arrangement to accomplish this is set forth in FIG. 9 herein, which is also set forth and described at FIG. 11 and col. 8, line 32-col. 9, line 22 of U.S. Pat. No. 3,768,985. Other fixturing arrangements which may be used in conjunction with this invention include the application of positive pressure by flex-weight loading, differences in gas pressure (as described in U.S. Pat. No. 5,199,631, incorporated herein by reference), and the application of differences in the coefficient of thermal expansion of fixturing devices (as described in U.S. Pat. No. 4,429,824, incorporated herein by reference).

While such positive pressure is provided to the assembly, the assembly is heated in a protective atmosphere such as a vacuum furnace. In one embodiment, the assembly is heated to a temperature in the range of about 1840–2000° F., most preferably about 1900° F. for at least 2 hours to cause melting between the metal foil and mating surfaces of the facing sheet and honeycomb core. In one preferred embodiment, the assembly is heated to a temperature of about 1840° F. for at least 2 hours and thereafter cooled to room temperature. In another preferred embodiment, the assembly is heated to a temperature of about 1900° F. and held at that temperature for 2 hours and thereafter cooled to room temperature. In a particularly preferred embodiment, the assembly is heated in a protective atmosphere such as a vacuum furnace at a heating rate of about 10° F./min. to a temperature of about 1300° F., and thereafter further heated at a heating rate of about 5° F./min. to a temperature of about 1900° F. for about 2 hours, followed by cooling of the assembly to room temperature. In another embodiment, the assembly comprising a metal foil comprising nickel, zirconium and chromium is heated to a temperature in the range of about 2500–2700° F. for at least 2 hours to cause melting between the metal foil and mating surfaces of the facing sheet and honeycomb core.

In initial trials, the metal foil was formed by melting the experimental alloy compositions under vacuum at 2100° F., and then cutting thin slices from the as-cast alloys. However, in the case of the chromium-containing alloy, complete melting could not be achieved at 2100° F. using this preparation technique. It is expected that this will not be a problem at melting temperatures from about 2500° F. to about 2700° F. or if the chromium containing alloy is prepared by melt-spinning (as described above), also in this temperature range.

The method of this invention results in the formation of a liquid interface diffusion bonded composition comprising a metal honeycomb core and a metal facing sheet bonded thereto, wherein the region of the bonded joint therebetween comprises an interface comprising nickel, zirconium, and the balance being at least one additional metal selected from the group consisting of titanium, niobium, and chromium. The interface is provided by the liquid interface diffusion bonding of the above described metal foil to the metal honeycomb core and metal facing sheet. During the later stages of the process, after formation of the liquid interface, but before cooling to room temperature, the structure is homogenized so that the chemical composition of the interface more closely resembles that of the core and face sheet materials.

The composition and method of this invention are further illustrated by the following examples, which are not intended to limit the invention in any way.

EXAMPLE 1

A LID diffusion bonded joint was prepared from a 0.020 in. thick solid INCONEL 625 (supplied by Special Metals Corp., Huntington, W. Va. and having a nominal composition: Ni, 22Cr, 9Mo, 4Nb) face sheet and a 0.5 in. high INCONEL 625 core made from 0.002 in. thick nickel INCONEL 625 foil ribbon by placing the mating surfaces of the core and face sheets together, with a 0.015 in. thick piece of metal sheet having a nominal composition of 76 wt. % Ni, 14 wt. % Zr, and 10 wt. % Ti. The metal sheet was prepared by melting the alloy components in an alumina crucible under vacuum at 2100° F. Thin slices were cut from solidified buttons of the alloy and were used to make the test specimens. The assembly was subjected to sufficient positive pressure to maintain position and alignment for joining, and the assembly was heated in a vacuum furnace as follows:

(1) Heated at 10° F./min. up to a temperature of about 1300° F.;
(2) Subsequently heated at 5° F./min. up to a temperature of about 1900° F.;
(3) Held at about 1900° F. for 2 hours; and
(4) Cooled to room temperature.

Figure 10:
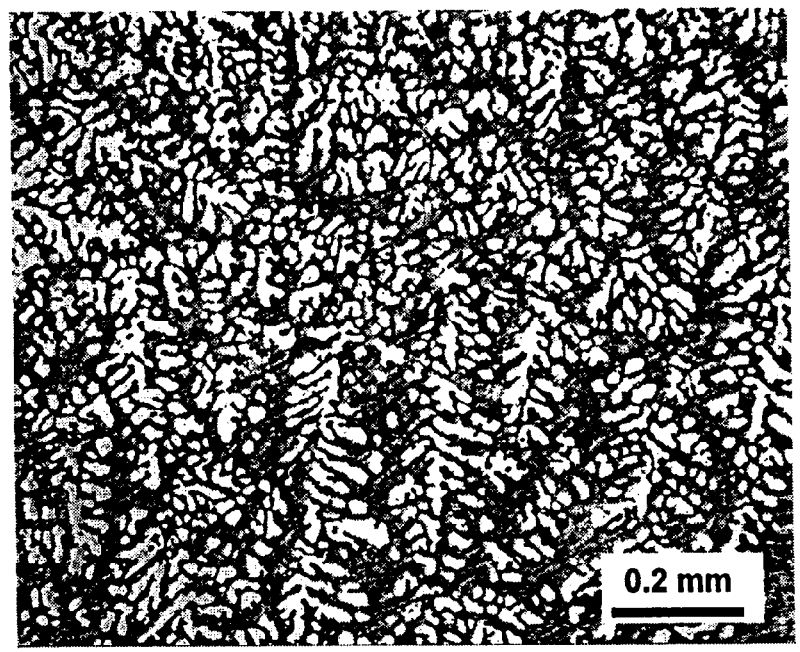
FIG. 10a is a micrograph of the alloy of Example 1 as-cast.
FIG. 10b is a micrograph of the alloy of Example 1 after bonding with core at 1900° F.
Figure 10:
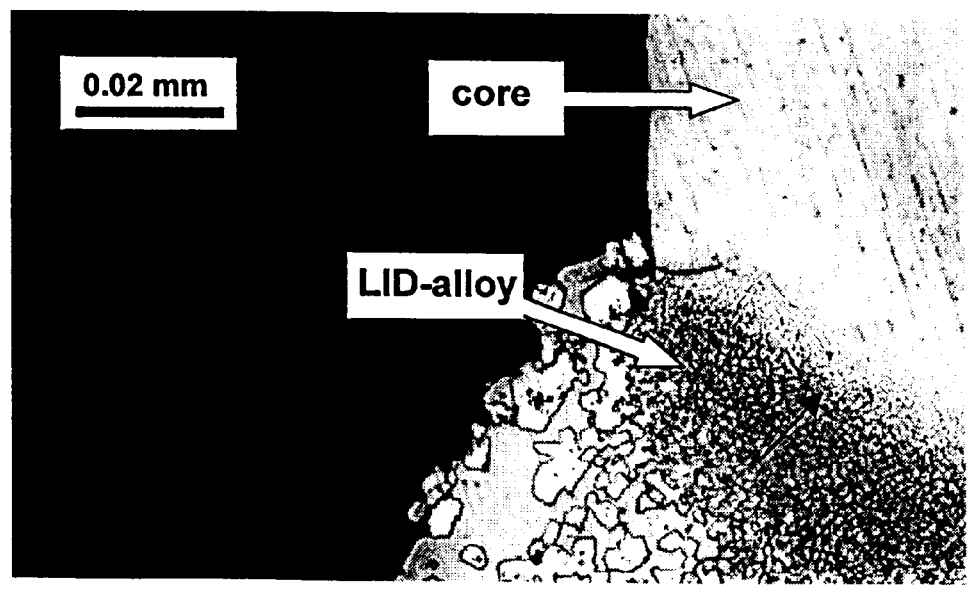

Metallographic analysis was performed on the alloy of Example 1. Reference is now made to the micrographs of the alloy, shown in FIG. 10a (as-cast) and FIG. 10b (after bonding with the core at 1900° F.). Although the microstructure was inhomogeneous and dendritic, as would be expected from an as-cast condition (FIG. 10a), after the bonding process described above, some interdiffusion occurred between the core and filler alloy, as shown by the arrow in FIG. 10b.

Energy-dispersive X-Ray Spectroscopy (EDX) analyses from the interface between the face sheet and the filler alloy showed elemental interdiffusion of Cr from the INCONEL 625 face sheet at least 50 μm into the filler metal and of Ti from the filler metal at least 30 μm into the face sheet.

Comparative Example 1

Figure 11:
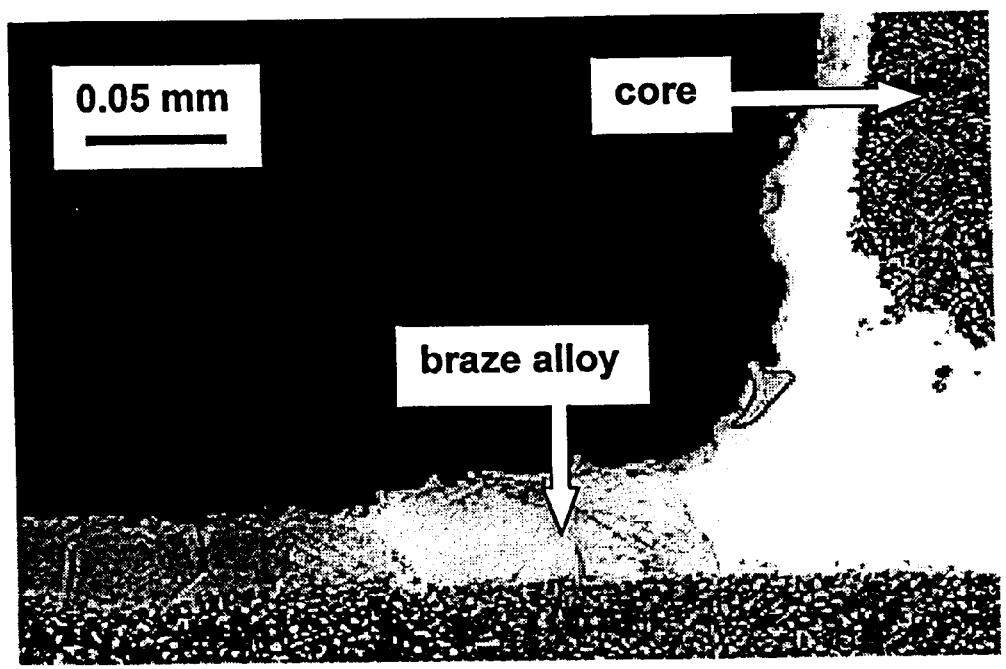
FIG. 11 is a micrograph of the joint from Comparative Example 1, showing INCONEL 625 face sheet brazed to INCONEL 625 core using 0.002 in. thick AMS 4777 braze foil at 1845° F. for 180 minutes followed by 1960° F. for 30 minutes.

A conventional brazed joint was prepared by joining INCONEL 625 face sheet, brazed to INCONEL 625 core using 0.002 in. thick AMS 4777 foil (82 wt. % Ni, 4.5 wt. % Si, 7 wt. % Cr, 3.1 wt. % B, 3 wt. % Fe) at 1845° F. for 180 mins. followed by joining at 1960° F. for 30 mins. A micrograph prepared from this joint is shown in FIG. 11. The microstructure clearly shows the relative lack of fusion between the braze alloy and both face skin and core (light and dark regions, respectively).

Although this invention has been illustrated by reference to various specific embodiments, it will be apparent to those skilled in the art that various changes and modifications may be made which clearly fall within the scope of this invention.

I claim:

1. A liquid interface diffusion bonded composition prepared by a method comprising:
   (a) providing a nickel-alloy honeycomb core having a mating surface and a nickel-alloy facing sheet having a mating surface;
   (b) placing together the honeycomb core mating surface and the facing sheet mating surface, and providing therebetween a metal foil comprising nickel, zirconium, and at least one additional metal selected from the group consisting of titanium and niobium;
   (c) subjecting the mating surfaces and metal foil therebetween to sufficient positive pressure to maintain position and alignment for joining; and
   (d) heating the mating surfaces and metal foil therebetween in a protective atmosphere to a temperature in the range of about 1840 to about 2000 degrees F. for at least 2 hours to cause melting between the metal foil and mating surfaces of the facing sheet and honeycomb core.

2. The composition of claim 1, in which the metal foil comprises about 10 to about 14 wt. % zirconium and about 8 to about 12 wt. % titanium, the remainder being nickel.

3. The composition of claim 1, in which the metal foil comprises about 10 to about 14 wt. % zirconium and about 20 to about 28 wt. % niobium, the remainder being nickel.

4. The composition of claim 1, in which the metal foil does not comprise copper and does not comprise boron and does not comprise silicon.

5. The composition of claim 1, in which the mating surfaces and metal foil therebetween are heated to a temperature of about 1900 degrees F. for about 2 hours.

6. The composition of claim 5, in which the mating surfaces and metal foil therebetween are heated to a temperature of about 1900 degrees F. for about 2 hours and thereafter cooled to room temperature.

7. A liquid interface diffusion bonded composition prepared by a method comprising:
   (a) providing a nickel-alloy honeycomb core having a mating surface and a nickel-alloy facing sheet having a mating surface;
   (b) placing together the honeycomb core mating surface and the facing sheet mating surface, and providing therebetween a metal foil comprising nickel, zirconium, and chromium, wherein the foil does not comprise boron;
   (c) subjecting the mating surfaces and metal foil therebetween to sufficient positive pressure to maintain position and alignment for joining; and (d) heating the mating surfaces and metal foil therebetween in a protective atmosphere to a temperature in the range of about 2500 to about 2700 degrees F. for at least 2 hours to cause melting between the metal foil and mating surfaces of the facing sheet and honeycomb core.

8. The composition of claim 7, in which the metal foil has a thickness of about 0.0008–0.0012 inches.

9. The composition of claim 8, in which the metal foil has a thickness of about 0.001 inches.

10. The composition of claim 7 or 5, in which the metal foil is formed by a rapid solidification process or a melt spinning process.

11. A liquid interface diffusion bonded composition prepared by a method comprising:

(a) providing a nickel-alloy honeycomb core having a mating surface and a nickel-alloy facing sheet having a mating surface;

(b) placing together the honeycomb core mating surface and the facing sheet mating surface, and providing therebetween a metal foil comprising about 10 to about 14 wt. % zirconium and about 45 to about 50 wt. % chromium, the remainder being nickel;

(c) subjecting the mating surfaces and metal foil therebetween to sufficient positive pressure to maintain position and alignment for joining; and (d) heating the mating surfaces and metal foil therebetween in a protective atmosphere to a temperature in the range of about 2500 to about 2700 degrees F. for at least 2 hours to cause melting between the metal foil and mating surfaces of the facing sheet and honeycomb core.

12. A liquid interface diffusion bonded composition prepared by a method comprising:

(a) providing a nickel-alloy honeycomb core having a mating surface and a nickel-alloy facing sheet having a mating surface;

(b) placing together the honeycomb core mating surface and the facing sheet mating surface, and providing therebetween a metal foil comprising nickel, zirconium, and chromium, and the metal foil does not comprise copper and does not comprise boron and does not comprise silicon;

(c) subjecting the mating surfaces and metal foil therebetween to sufficient positive pressure to maintain position and alignment for joining; and (d) heating the mating surfaces and metal foil therebetween in a protective atmosphere to a temperature in the range of about 2500 to about 2700 degrees F. for at least 2 hours to cause melting between the metal foil and mating surfaces of the facing sheet and honeycomb core.

\* \* \* \* \*

UNITED STATES PATENT AND TRADEMARK OFFICE
CERTIFICATE OF CORRECTION

PATENT NO. : 6,720,086 B1
DATED : April 13, 2004
INVENTOR(S) : Andrew J. Strutt

It is certified that error appears in the above-identified patent and that said Letters Patent is hereby corrected as shown below:

Column 11,
Line 7, after "claim" insert -- 1 or --.

Signed and Sealed this

Fourth Day of January, 2005

JON W. DUDAS
*Director of the United States Patent and Trademark Office*